United States Patent
Kerkau et al.

Patent Number: 5,931,124
Date of Patent: Aug. 3, 1999

[54] VALVE TIMING FOR INTERNAL-COMBUSTION ENGINES

[75] Inventors: Martin Kerkau, Ötisheim, Germany; Ingemar Denbratt; Jan-Erling Rydquist, both of Kullavik, Sweden

[73] Assignee: Dr. Ing. H.c.F. Porsche AG, Weissach, Germany

[21] Appl. No.: 08/877,855

[22] Filed: Jun. 18, 1997

[30] Foreign Application Priority Data

Jun. 18, 1996 [DE] Germany .......................... 196 24 230

[51] Int. Cl.⁶ ............................................. F01L 13/00
[52] U.S. Cl. ........................................................ 123/90.15
[58] Field of Search ................... 123/90.15, 90.16, 123/90.17

[56] References Cited

U.S. PATENT DOCUMENTS

| | | | |
|---|---|---|---|
| 3,714,932 | 2/1973 | Meacham et al. | 123/90.15 |
| 5,233,831 | 8/1993 | Hitomi et al. | 123/90.15 |
| 5,309,872 | 5/1994 | Filippi et al. | 123/90.15 |
| 5,323,739 | 6/1994 | Mollers | 123/90.15 |
| 5,367,990 | 11/1994 | Schechter | 123/90.15 |
| 5,497,737 | 3/1996 | Nakamura | 123/90.15 |
| 5,622,144 | 4/1997 | Nakamura et al. | 123/90.15 |

FOREIGN PATENT DOCUMENTS

| | | |
|---|---|---|
| 0761950A1 | 3/1997 | European Pat. Off. . |
| 3506107A1 | 8/1985 | Germany . |
| 34 37 330 | 4/1986 | Germany . |
| 2134596 | 8/1984 | United Kingdom . |
| 2274878 | 8/1994 | United Kingdom . |
| WO91/16529 | 10/1991 | WIPO . |

OTHER PUBLICATIONS

*VDI Berichte NR.* 1099, 1993, entitled "Measures for reducing consumption and exhaust emissions on the basis of 4–valve technology", pp. 41–57.

*Primary Examiner*—Weilun Lo
*Attorney, Agent, or Firm*—Evenson, McKeown, Edwards & Lenahan, PLLC

[57] ABSTRACT

The invention relates to a valve timing for an internal-combustion engine with a variable control of the outlet valve. For reducing the HC-emissions, it is suggested according to the invention to adjust the closing of the outlet valve toward "early". This adjustment must be carried out to such an extent that the outlet valve will be closed before the piston has reached the upper dead center.

24 Claims, 3 Drawing Sheets

VALVE TIMING FOR INTERNAL-COMBUSTION ENGINES

BACKGROUND AND SUMMARY OF THE INVENTION

This application claims the priority of German application 196 24 230.4 filed in Germany on Jun. 18, 1996, the disclosure of which is expressly incorporated by reference herein.

The invention relates to a valve timing for an internal-combustion engine operating according to the Otto cycle and having a combination space in a cylinder above a piston, which space is closable by at least one inlet valve and one outlet valve.

Demands on modern internal-combustion engines with respect to reducing emission values as much as possible are constantly rising. In order to meet these demands, emission control systems, particularly catalysts, are as a rule connected behind the internal-combustion engines. These catalysts convert the pollutants contained in the exhaust gas. The problem occurs in this context that naturally the pollutant concentration downstream of the emission control system is the lower the fewer pollutants—so-called raw emissions—exist in the exhaust gas directly behind the internal-combustion engine. On the other hand, there is the problem that, for their efficiency as a result of their construction, emission control systems require a certain operating temperature. If this operating temperature has not been reached, the purification effect is low or non-existent so that, in this operating range, the raw emissions essentially determine the pollutant emissions flowing out of the emission control system.

From German Patent Document DE 35 06 107 A1, it is known to advance the start of the opening of the outlet valve in order to supply to the exhaust system and particularly to the emission control system, a higher-energy, hotter exhaust gas which is to lead to a faster heating-up of the emission control system.

From International Patent Document WO 91/16529, it is known to provide, in addition to a device for advancing the start of the opening of the outlet valve, a device by means of which the opening duration of the inlet valves can be influenced. This device can influence the supplied engine power and thus the exhaust gas temperature.

It is an object of the invention to provide a valve timing for internal-combustion engines by means of which the raw emissions can be reduced.

The invention is based on the recognition that, in contrast to the opinion expressed in the prior art, an early closing of the outlet valve, specifically a closing before the upper dead center is reached, has no influence on the exhaust gas temperature and therefore no influence on the time which the emission control system requires for reaching its operating temperature but, on the contrary, clearly reduces the raw emissions of the internal-combustion engine, here, particularly the hydrocarbon proportions. This effect is particularly pronounced within the range of low loads.

According to the invention, it is therefore suggested to adjust the closing of the outlet valve so far toward early that the outlet valve is closed before the piston reaches the upper dead center. As a result, a defined residual gas volume is retained in the combustion space. Therefore, it is advantageously achieved that mainly the hydrocarbon proportions in the raw emissions but also the nitrogen oxide proportions and carbon monoxide proportions will be reduced.

It is suggested according to an advantageous feature of preferred embodiments of the invention to influence the point in time of the closing of the outlet valve in that the whole timing of the outlet valve is displaced by a predetermined amount in the direction of "early".

As an alternative, it is contemplated according to certain preferred embodiments of the invention to carry out the valve timing such that only the closing of the outlet valve is displaced in the prescribed manner toward "early".

In addition, it is suggested according to certain preferred embodiments of the invention that the above-described measures be carried out only when the load in the internal-combustion engine is low. The limit load up to which the measures are taken may, in addition, be a function of the temperature of the internal-combustion engine in order to expand the load range for the application of the described measures when the internal-combustion engine is cold and the emission control system is therefore also not ready to operate.

Other objects, advantages and novel features of the present invention will become apparent from the following detailed description of the invention when considered in conjunction with the accompanying drawings.

DETAILED DESCRIPTION OF THE INVENTION

Figure 1:
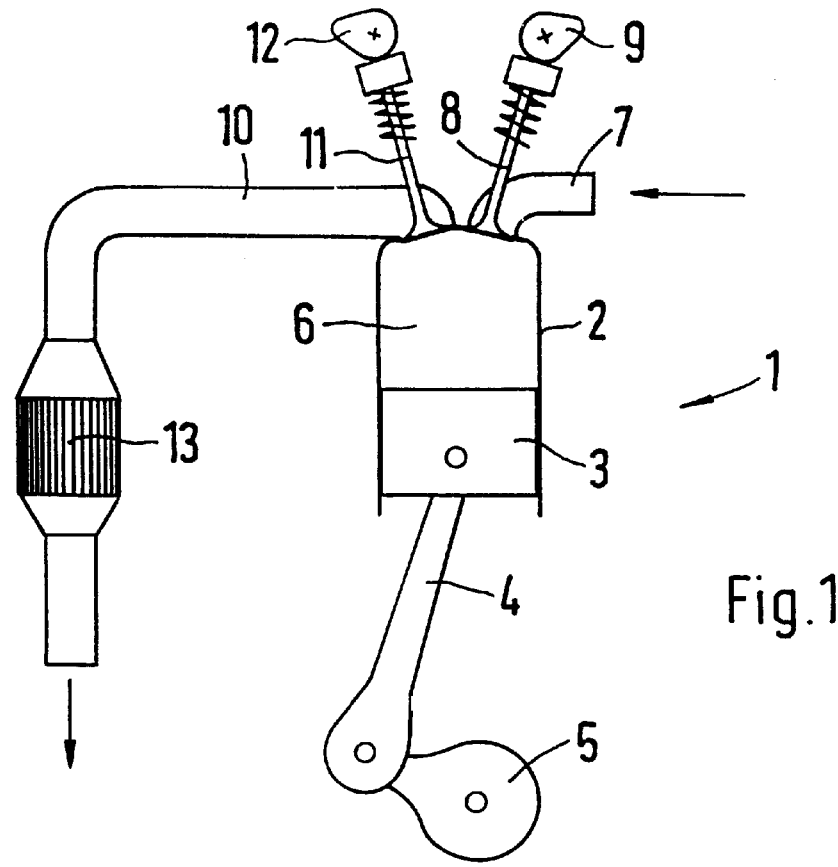
FIG. 1 is a schematic representation of an internal-combustion engine of the type contemplated according to preferred embodiments of the invention.

The internal-combustion engine 1 schematically illustrated in FIG. 1 has a cylinder 2 on which a piston 3 is guided in a longitudinally movable manner. By way of a connecting rod 4 and a crankshaft 5, the movement of the piston 3 is translated into a rotating movement of the crankshaft 5. A combustion space 6 which is formed in the cylinder 2 above the piston 3 is filled with an air-fuel mixture through an inlet duct 7. The inlet duct 7 can be closed toward the combustion space 6 by means of an inlet valve 8. The inlet valve 8 is operated by means of an inlet cam 9.

Opposite the inlet duct 7, an outlet duct 10 is provided which can be closed off by way of an outlet valve 11 in the direction of the combustion space 6. The outlet valve 11 is operated by an outlet cam 12. A catalyst 13 is provided in the outlet duct 10 which is used as an emission control device.

Figure 2:
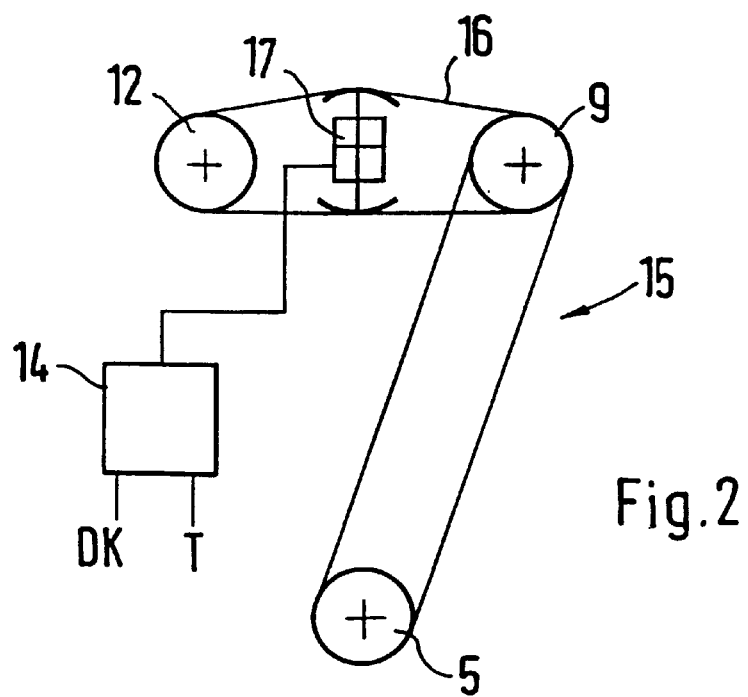
FIG. 2 is a schematic view of a first embodiment of a valve timing gear according to the present invention.

As illustrated schematically in FIG. 2, the inlet cam 9 and the outlet cam 12 are connected with the crankshaft 5 by means of a valve timing gear 15. In the embodiment illustrated in FIG. 2, the inlet cam 9 is coupled directly with the crankshaft 5, while the outlet cam 12 is indirectly connected with the crankshaft 5 by way of a chain drive 16 which is arranged between the inlet cam 9 and the outlet cam 12 and which is acted upon by a control element 17. Depending on the position of the control element 17, the phase position of the outlet cam 12 to the inlet cam 9 and thus to the crankshaft 5 is shifted. In this case, the control element 17 is operated by a control device 14 which adjusts the control element 17 as a function of the input quantities load DK of the internal-combustion engine 1 and temperature T of the catalyst 13.

Figure 7:
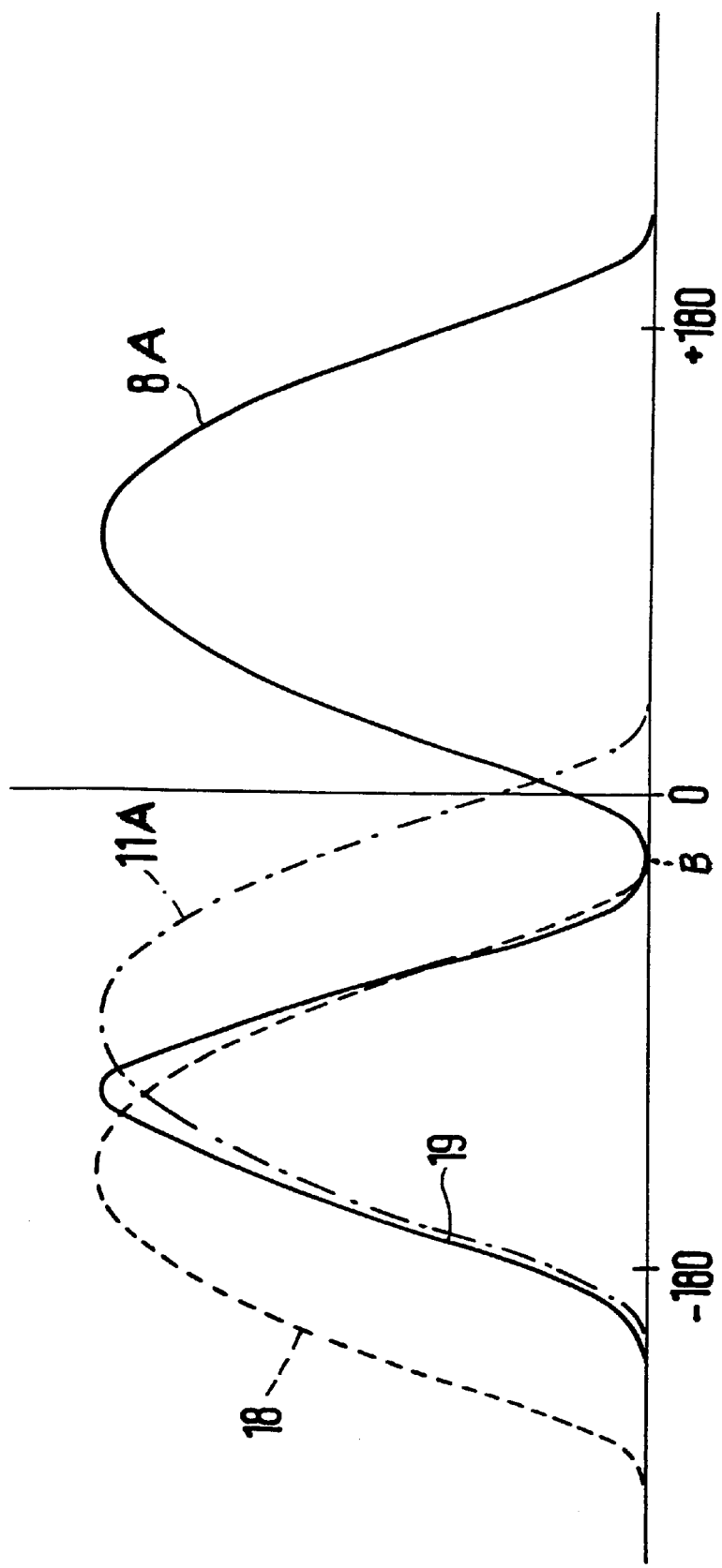
FIG. 7 is a valve timing diagram for the valves of the internal-combustion engine in accordance with preferred embodiments of the present invention.

In a valve timing diagram, FIG. 7 shows the elevation curves 8A for the inlet valve 8 and 11A for the outlet valve 11. The angles applied to the X-axis relate to the angular position of the crankshaft 5, in which case the angular position 0° will be reached when the piston 3 has reached its upper or top dead center TDC. In the present embodiments, the operation of the inlet valve 8 is not changed while, in contrast, the valve timing and therefore the elevation curve 11A of the outlet valve 11 can be changed by the illustrated devices.

By means of the device illustrated in FIG. 2, an elevation curve 18 in FIG. 7 can be achieved when the control element 17 is operated. In contrast to the original elevation curve 11A of the outlet valve 11, the elevation curve 18 is shifted in the "early" direction. Because here the whole elevation curve was shifted while retaining its basic form, the opening as well as the closing of the outlet valve 11 are shifted in the "early" direction.

Figure 3:
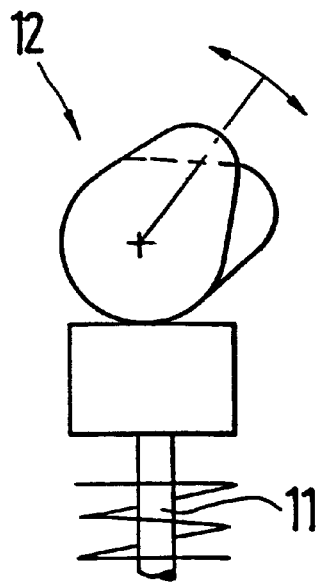
FIG. 3 is a lateral schematic view of a second embodiment of a valve timing gear according to the present invention.
Figure 4:
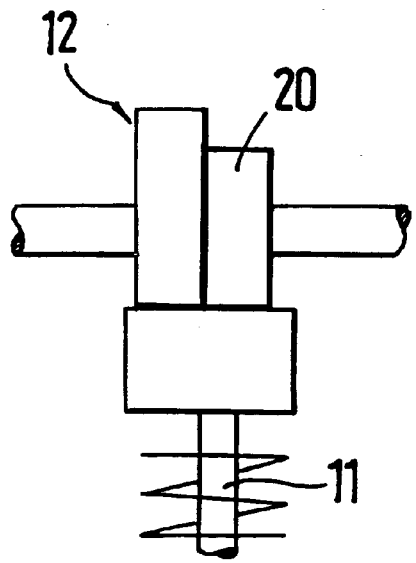
FIG. 4 is a frontal schematic view of the second embodiment of the valve timing gear.

In the case of the second embodiment for operating the outlet valve 11 illustrated in FIGS. 3 and 4, two outlet cams 12, 20 are arranged side-by-side. The second outlet cam 20 has the same contour as the first outlet cam 12 but can be moved relative to it. Such a movement is also triggered by a control device 14 which is not shown here. In the case of shifted second outlet cams 20, the elevation curve is generated for the normal operation of the outlet valve 11. When, upon a command of the control device 14, the second outlet cam 20 is shifted relative to the first outlet cam 12 behind this outlet cam 12, the common contour results in the elevation curve which in FIG. 7 has the reference number 19 and in the case of which only the closing of the outlet valve 11 is shifted in the "early" direction relative to the top dead center TDC, while the start of the opening of the outlet valve 11 remains unchanged.

Figure 5:
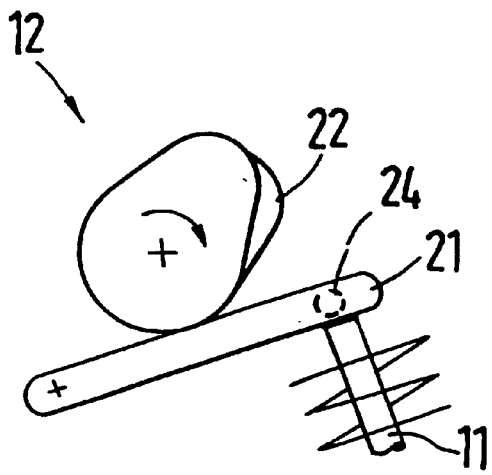
FIG. 5 is a lateral view of a third embodiment of a valve timing gear according to the present invention.
Figure 6:
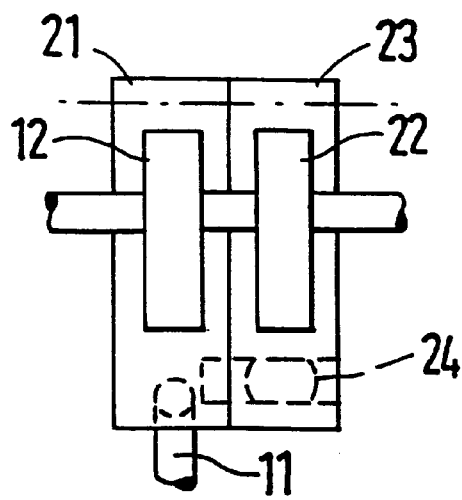
FIG. 6 is a top view of the third embodiment of the valve timing gear.

Finally FIGS. 5 and 6 show a third embodiment for a valve operation. The outlet valve 11 is now operated by way of a valve lever 21 which, in turn, is operated by the outlet cam 12. In parallel to the outlet cam 12, another outlet cam 22 is arranged which acts upon a second valve lever 23. By means of a connection device 24, the second valve lever 23 can be coupled with the first valve lever 21. By means of this coupling, the outlet valve 11 is now operated corresponding to the respective larger contour of the additional outlet cam 22. Also in this embodiment, the connection device is operated by the control device 14 which is not shown in detail.

In the normal condition, the connection device 24 is operated, and the outlet valve 11 is operated only by means of the additional outlet cam 22; the elevation curve 11A is therefore effective. In contrast, when the connection device 24 is released, the first outlet cam 12 is operative which has a slightly smaller outer contour with an earlier closing of the outlet valve 11. In the valve timing diagram according to FIG. 7, this results in the elevation curve 19, according to which the closing of the outlet valve 11 is shifted to "early".

In the illustrated three embodiments, a displacement of the timing of the outlet valve 11 toward "early" takes place when the internal-combustion engine 1 is in ranges of a small load DK where the displacement with respect to the reduction of the pollutant proportions in the exhaust gas upstream of the catalyst 13 is particularly effective. As long as the internal-combustion engine 1 and the catalyst 13 have not yet reached their operating temperature and the catalyst 13 is therefor not yet able to effectively reduce the pollutant proportions, by means of the control device 14, the range of the load DK in which a displacement of the timing is carried out, is expanded toward higher loads. In all other operating ranges, the originally selected valve timing of the internal-combustion engine is used.

During the tests carried out, the maximum opening of the outlet device, that is, the highest point of the elevation curve, for the outlet valve 11 in the valve timing diagram according to FIG. 7 was at a crankshaft angle of 87° in front of the top dead center position. A shifting to a maximum opening of the outlet device of a crankshaft angle of approximately 130° in front of the top dead center remained without any effect. The HC-emissions are drastically reduced only in the case of an outlet device maximum opening corresponding to a 135° crankshaft angle and larger before the top dead center position as with this crankshaft angle the closing point B is displaced so far toward "early" that the outlet valve closes just before the top dead center position (BTDC). In especially preferred practical embodiments of the invention, the maximum opening of the outlet device is moved to between 135° and 160° BTDC, with a corresponding closing of the outlet valve (position B in FIG. 7) at between 0° and 25° BTDC. In especially preferred embodiments, the outlet valve is closed between 5° and 15° BTDC with a desired effect being reached in testing with closing of the outlet valve at approximately 10° BTDC.

In connection with the overall emissions of the vehicle, it is particularly advantageous that the HC-emissions are reduced not only in the first idling phase of the internal-combustion engine after the start, but that, in addition, the peak HC-value is completely avoided which normally occurs when the timing of the outlet valve 11 is not changed. As a result, particularly for testing procedures for emission control systems, the overall amount of emissions which is detected in the course of the testing procedure is clearly reduced.

The reason for the achieved reduction of the HC-emissions is that, as the result of the closing of the outlet valves 11 before the top dead center TDC position is reached, a fixedly defined residual gas proportion remains in the combustion space 6. This residual gas proportion leads to a higher temperature of the fresh gas mixture and thus to a better mixture preparation and combustion. These considerations were confirmed by the fact that, during measurements on an internal-combustion engine operated according to the invention, a very balanced course of the lambda values of the exhaust gas could be achieved.

If, at the same time, the opening of the outlet valve 11 is shifted in the "early" direction, the higher pressure gradient during the opening of the outlet valve 11 will in addition lead to a higher gas velocity in the outlet duct 10 and thus to better secondary reactions of the exhaust gas constituents.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Valve timing method for an Otto cycle internal-combustion engine having a combustion space formed in a cylinder above a piston which is closable by at least one inlet valve and by at least one outlet valve, comprising adjusting closing of the outlet valve so far toward early that the outlet valve will be closed before the piston reaches top dead center while not changing opening of the inlet valve, thereby reducing the raw emissions of the engine.

2. Valve timing method according to claim 1, wherein the adjusting of the closing of the outlet valve takes place by displacing the whole elevation curve of the outlet valve in an "early" direction.

3. Valve timing method according to claim 1, wherein the adjusting of the closing of the outlet valve takes place by shifting the closing of the outlet valve in the "early" direction.

4. Valve timing method according to claim 1, wherein the adjusting of the closing of the outlet valve takes place in a predetermined load range of the engine.

5. Valve timing method according to claim 2, wherein the adjusting of the closing of the outlet valve takes place in a predetermined load range of the engine.

6. Valve timing method according to claim 3, wherein the adjusting of the closing of the outlet valve takes place in a predetermined load range of the engine.

7. Valve timing method according to claim 4, wherein the predetermined load range of the engine in which the closing of the outlet valve is adjusted takes place as a function of at least one of the temperature of the engine and of the emission control system connected behind the engine.

8. Valve timing method according to claim 5, wherein the predetermined load range of the engine in which the closing of the outlet valve is adjusted takes place as a function of at least one of the temperature of the engine and of the emission control system connected behind the engine.

9. Valve timing method according to claim 6, wherein the predetermined load range of the engine in which the closing of the outlet valve is adjusted takes place as a function of at least one of the temperature of the engine and of the emission control system connected behind the engine.

10. Valve timing method according to claim 7, wherein the predetermined load range is adjusted as a function of the temperature of the engine.

11. Valve timing method according to claim 7, wherein the predetermined load range is adjusted as a function of the emission control system connected behind the engine.

12. Valve timing method according to claim 1, wherein the outlet valve is closed between 0° and 25° before the top dead center position of the piston.

13. Valve timing method according to claim 12, wherein the outlet valve is closed between 5° and 15° before the top dead center position of the piston.

14. Valve timing method according to claim 13, wherein the outlet valve is closed at approximately 10° before the top dead center position of the piston.

15. Valve timing apparatus for an Otto cycle internal-combustion engine having a combustion space formed in a cylinder above a piston which is closable by at least one inlet valve and by at least one outlet valve, comprising an adjuster for closing the outlet valve so far toward early that the outlet valve will be closed before the piston reaches top dead center while not changing opening of the inlet valve, thereby reducing the raw emissions of the engine.

16. Valve timing apparatus according to claim 15, wherein the adjusting of the closing of the outlet valve takes place by displacing the whole elevation curve of the outlet valve in an "early" direction.

17. Valve timing apparatus according to claim 15, wherein the adjusting of the closing of the outlet valve takes place by shifting the closing of the outlet valve in the "early" direction.

18. Valve timing apparatus according to claim 15, wherein the adjusting of the closing of the outlet valve takes place in a predetermined load range of the engine.

19. Valve timing apparatus according to claim 18, wherein the predetermined load range of the engine in which the closing of the outlet valve is adjusted takes place as a function of at least one of the temperature of the engine and of the emission control system connected behind the engine.

20. Valve timing apparatus according to claim 15, wherein the adjuster is configured to close the outlet valve between 0° and 25° before the top dead center position of the piston.

21. Valve timing apparatus according to claim 20, wherein the adjuster is configured to close the outlet valve between 5° and 15° before the top dead center position of the piston.

22. Valve timing apparatus according to claim 21, wherein the adjuster is configured to close the outlet valve at approximately 10° before the top dead center position of the piston.

23. Valve timing method according to claim 1, wherein under normal operation of the internal combustion engine, closing of the outlet valve occurs after the piston reaches top dead center.

24. Valve timing apparatus according to claim 15, wherein under normal operation, the adjuster closes the outlet valve after the piston reaches top dead center.

* * * * *